(12) United States Patent
Chae et al.

(10) Patent No.: US 6,741,320 B2
(45) Date of Patent: May 25, 2004

(54) METHOD FOR CUTTING LIQUID CRYSTAL DISPLAY PANEL

(75) Inventors: Kyung-Su Chae, Taegu-kwangyokshi (KR); Sang-Sun Shin, Kyongsangbuk-do (KR)

(73) Assignee: L.G.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 10/256,100

(22) Filed: Sep. 27, 2002

(65) Prior Publication Data

US 2003/0155391 A1 Aug. 21, 2003

(30) Foreign Application Priority Data

Feb. 20, 2002 (KR) .................... 2002-0009126

(51) Int. Cl.[7] .............................. G02F 1/13; B26F 3/00
(52) U.S. Cl. ........................... 349/187; 225/2; 225/103
(58) Field of Search ............................. 349/187, 1, 73, 349/158, 155, 43; 252/2, 103; 438/30

(56) References Cited

U.S. PATENT DOCUMENTS

| | | |
|---|---|---|
| 3,978,580 A | 9/1976 | Leupp et al. |
| 4,094,058 A | 6/1978 | Yasutake et al. |
| 4,653,864 A | 3/1987 | Baron et al. |
| 4,691,995 A | 9/1987 | Yamazaki et al. |
| 4,775,225 A | 10/1988 | Tsuboyama et al. |
| 5,247,377 A | 9/1993 | Omeis et al. ............ 359/76 |
| 5,263,888 A | 11/1993 | Ishihara et al. |
| 5,379,139 A | 1/1995 | Sato et al. |
| 5,406,989 A | 4/1995 | Abe |
| 5,499,128 A | 3/1996 | Hasegawa et al. |
| 5,507,323 A | 4/1996 | Abe |
| 5,511,591 A | 4/1996 | Abe ........................ 141/7 |
| 5,539,545 A | 7/1996 | Shimizu et al. |
| 5,548,429 A | 8/1996 | Tsujita |
| 5,642,214 A | 6/1997 | Ishii et al. ............... 349/96 |
| 5,680,189 A | 10/1997 | Shimizu et al. |
| 5,742,370 A | 4/1998 | Kim et al. ............... 349/124 |
| 5,757,451 A | 5/1998 | Miyazaki et al. |
| 5,852,484 A | 12/1998 | Inoue et al. |
| 5,854,664 A | 12/1998 | Inoue et al. |
| 5,861,932 A | 1/1999 | Inata et al. |
| 5,875,922 A | 3/1999 | Chastine et al. |
| 5,952,676 A | 9/1999 | Sato et al. |
| 5,956,112 A | 9/1999 | Fujimori et al. |
| 6,001,203 A | 12/1999 | Yamada et al. |
| 6,011,609 A | 1/2000 | Kato et al. ............... 349/190 |
| 6,016,178 A | 1/2000 | Kataoka et al. ........... 349/117 |
| 6,016,181 A | 1/2000 | Shimada |
| 6,055,035 A | 4/2000 | Von Gutfeld et al. ..... 349/187 |
| 6,163,357 A | 12/2000 | Nakamura ............... 349/155 |
| 6,219,126 B1 | 4/2001 | Von Gutfeld |
| 6,226,067 B1 | 5/2001 | Nishiguchi et al. ....... 349/155 |
| 6,236,445 B1 | 5/2001 | Foschaar et al. |
| 6,304,306 B1 | 10/2001 | Shiomi et al. ............ 349/88 |

(List continued on next page.)

FOREIGN PATENT DOCUMENTS

| | | |
|---|---|---|
| EP | 1003066 | 5/2000 |
| JP | 51-65656 | 6/1976 |
| JP | 52-149725 | 12/1977 |

(List continued on next page.)

*Primary Examiner*—James Dudek
*Assistant Examiner*—Tai Duong
(74) *Attorney, Agent, or Firm*—Morgan, Lewis & Bockius LLP

(57) ABSTRACT

A method for cutting a liquid crystal display panel is disclosed in the present invention. The method includes forming a first scribing line on surfaces of first and second mother substrates using first and second wheels, cutting the first and second mother substrates along the first scribing line, forming a second scribing line on the second mother substrate using the second wheel, and removing a dummy region from the second mother substrate by cutting the second mother substrate along the second scribing line.

16 Claims, 8 Drawing Sheets

U.S. PATENT DOCUMENTS

| | | | |
|---|---|---|---|
| 6,304,311 B1 | 10/2001 | Egami et al. | |
| 6,337,730 B1 | 1/2002 | Ozaki et al. | |
| 6,414,733 B1 | 7/2002 | Ishikawa et al. | 349/110 |
| 2001/0021000 A1 | 9/2001 | Egami et al. | |
| 2003/0151717 A1 * | 8/2003 | Shin | 349/158 |
| 2004/0001177 A1 * | 1/2004 | Byun et al. | 349/187 |

FOREIGN PATENT DOCUMENTS

| | | |
|---|---|---|
| JP | 57-38414 | 3/1982 |
| JP | 57-88428 | 6/1982 |
| JP | 58-27126 | 2/1983 |
| JP | 59-57221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-55625 | 3/1986 |
| JP | 62-89025 | 4/1987 |
| JP | 62-90622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | 5-127179 | 5/1993 |
| JP | 5-154923 | 6/1993 |
| JP | 5-265011 | 10/1993 |
| JP | 5-281557 | 10/1993 |
| JP | 5-281562 | 10/1993 |
| JP | 6-51256 | 2/1994 |
| JP | 6-148657 | 5/1994 |
| JP | 6-160871 | 6/1994 |
| JP | 6-235925 | 8/1994 |
| JP | 6-313870 | 8/1994 |
| JP | 6-265915 | 9/1994 |
| JP | 7-84268 | 3/1995 |
| JP | 7-128674 | 5/1995 |
| JP | 7-181507 | 7/1995 |
| JP | 8-95066 | 4/1996 |
| JP | 8-101395 | 4/1996 |
| JP | 8-106101 | 4/1996 |
| JP | 8-171094 | 7/1996 |
| JP | 8-190099 | 7/1996 |
| JP | 8-240807 | 9/1996 |
| JP | 9-5762 | 1/1997 |
| JP | 9-26578 | 1/1997 |
| JP | 9-61829 | 3/1997 |
| JP | 9-73075 | 3/1997 |
| JP | 9-73096 | 3/1997 |
| JP | 9-127528 | 5/1997 |
| JP | 9-230357 | 9/1997 |
| JP | 9-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | 10-221700 | 8/1998 |
| JP | 10-282512 | 10/1998 |
| JP | 10-333157 | 12/1998 |
| JP | 10-333159 | 12/1998 |
| JP | 11-133438 | 12/1998 |
| JP | 11-14953 | 1/1999 |
| JP | 11-38424 | 2/1999 |
| JP | 11-64811 | 3/1999 |
| JP | 11-109388 | 4/1999 |
| JP | 11-142864 | 5/1999 |
| JP | 11-174477 | 7/1999 |
| JP | 11-212045 | 8/1999 |
| JP | 11-248930 | 9/1999 |
| JP | 11-326922 | 11/1999 |
| JP | 11-344714 | 12/1999 |
| JP | 2000-2879 | 1/2000 |
| JP | 2000-29035 | 1/2000 |
| JP | 2000-56311 | 2/2000 |
| JP | 2000-66165 | 3/2000 |
| JP | 2000-137235 | 5/2000 |
| JP | 2000-147528 | 5/2000 |
| JP | 2000-193988 | 7/2000 |
| JP | 2000-241824 | 8/2000 |
| JP | 2000-284295 | 10/2000 |
| JP | 2000-292799 | 10/2000 |
| JP | 2000-310759 | 11/2000 |
| JP | 2000-310784 | 11/2000 |
| JP | 2000-338501 | 12/2000 |
| JP | 2001-5401 | 1/2001 |
| JP | 2001-5405 | 1/2001 |
| JP | 2001-13506 | 1/2001 |
| JP | 2001-33793 | 2/2001 |
| JP | 2001-42341 | 2/2001 |
| JP | 2001-51284 | 2/2001 |
| JP | 2001-66615 | 3/2001 |
| JP | 2001-91727 | 4/2001 |
| JP | 2001-117105 | 4/2001 |
| JP | 2001-117109 | 4/2001 |
| JP | 2001-133745 | 5/2001 |
| JP | 2001-133794 | 5/2001 |
| JP | 2001-133799 | 5/2001 |
| JP | 2001-142074 | 5/2001 |
| JP | 2001-147437 | 5/2001 |
| JP | 2001-154211 | 6/2001 |
| JP | 2001-166272 | 6/2001 |
| JP | 2001-166310 | 6/2001 |
| JP | 2001-183683 | 7/2001 |
| JP | 2001-201750 | 7/2001 |
| JP | 2001-209052 | 8/2001 |
| JP | 2001-209060 | 8/2001 |
| JP | 2001-215459 | 8/2001 |
| JP | 2001-222017 | 8/2001 |
| JP | 2001-235758 | 8/2001 |
| JP | 2001-255542 | 9/2001 |
| JP | 2001-264782 | 9/2001 |
| JP | 2001-272640 | 10/2001 |
| JP | 2001-281675 | 10/2001 |
| JP | 2001-281678 | 10/2001 |
| JP | 2001-282126 | 10/2001 |
| JP | 2001-305563 | 10/2001 |
| JP | 2001-330837 | 11/2001 |
| JP | 2001-330840 | 11/2001 |
| JP | 2001-356353 | 12/2001 |
| JP | 2001-356354 | 12/2001 |
| JP | 2002-14360 | 1/2002 |
| JP | 2002-23176 | 1/2002 |
| JP | 2002-49045 | 2/2002 |
| JP | 2002-82340 | 3/2002 |
| JP | 2002-90759 | 3/2002 |
| JP | 2002-90760 | 3/2002 |
| JP | 2002-107740 | 4/2002 |
| JP | 2002-122872 | 4/2002 |
| JP | 2002-122873 | 4/2002 |
| JP | 2002-139734 | 5/2002 |
| JP | 2002-202512 | 7/2002 |
| JP | 2002-202514 | 7/2002 |
| JP | 2002-214626 | 7/2002 |
| KR | 2000-35302 | 6/2000 |

* cited by examiner

METHOD FOR CUTTING LIQUID CRYSTAL DISPLAY PANEL

This application claims the benefit of the Korean Application No. P2002-009126 filed on Feb. 20, 2002, which is hereby incorporated by reference.

BACKGROUND OF THE INVENTION

1. Field of the Invention

The present invention relates to a liquid crystal display panel, and more particularly, to a method for cutting a liquid crystal display panel to separate a plurality of unit LCD panels from the mother substrate.

2. Discussion of the Related Art

In general, a liquid crystal display (hereinafter, referred to as "LCD") device displays a picture by individually supplying a data signal according to picture information to the liquid crystal cell arranged in a matrix form and controlling light transmittance of the liquid crystal cells.

In the LCD device, thin film transistor (hereinafter, referred to as "TFT") array substrates are formed on a large mother substrate, and color filter substrates are formed on another mother substrate. By attaching the two mother substrates, a plurality of unit LCD panels are simultaneously formed. Since yield can be increased by simultaneously forming a plurality of the unit LCD panels on a glass substrate of a large area, a process of cutting the attached two mother substrates into unit LCD panels is required.

Conventionally, the cutting process includes a scribing process of forming a predetermined cutting line on the surface of the substrate with a diamond pen having a hardness higher than the glass substrate and a breaking process of cutting by applying a physical force. The cutting process of the unit LCD panel will be described in detail with reference to the accompanied drawings.

FIG. 1 is a schematic plane view showing a unit LCD panel formed from a TFT array substrate and a color filter substrate attached to face into each other.

In FIG. 1, an LCD panel 10 includes a picture display unit 13 having a plurality of liquid crystal cells arranged in a matrix form, a gate pad unit 14 connected to a plurality of gate lines of the picture display unit 13, and a data pad unit 15 connected to a plurality of data lines of the picture display unit 13.

The gate pad unit 14 and the data pad unit 15 are formed at the marginal portion of the TFT array substrate 1. The marginal portion does not overlap the color filter substrate 2.

The gate pad unit 14 provides a scan signal supplied from the gate driver integrated circuit to the gate lines of the picture display unit 13. The data pad unit 15 supplies picture information supplied from the data driver integrated circuit to the data lines of the picture display unit 13.

The data lines receiving the picture information and the gate lines receiving the scan signal are disposed to be perpendicularly crossed with each other on the TFT array substrate 1 of the picture display unit 13. At the crossed portion, a TFT is formed for switching the liquid crystal cells, and a pixel electrode is formed to be connected to the TFT for driving the liquid crystal cells. Further, a protective layer is formed at the entire surface to protect the electrode and the TFT.

At the color filter substrate 2 of the picture display unit 13, a plurality of color filters are formed to be separated by cell regions with a black matrix, and a common transparent electrode corresponding to the pixel electrode are formed at the TFT array substrate 1.

A cell gap is formed between the TFT array substrate 1 and the color filter substrate 2 so that the two substrates are spaced apart from and face into each other. The TFT array substrate 1 and the color filter substrate 2 are attached by a sealant (not shown) formed at the exterior of the picture display unit 13. A liquid crystal layer (not shown) is formed at the space between the TFT array substrate 1 and the color filter substrate 2.

FIG. 2 is a cross-sectional view showing a plurality of the unit LCD panels formed in the first mother substrate having the TFT array substrates and the second mother substrate having the color filter substrates of FIG. 1.

As shown in FIG. 2, a plurality of the unit LCD panels are formed in such a manner that one side of the TFT array substrates 1 is protruded as much as a dummy region 31.

This is because the gate pad unit 14 and the data pad unit 15 are formed at the marginal portion where the TFT array substrates 1 and the color filter substrates 2 do not overlap.

Thus, the color filter substrates 2 formed on the second mother substrate 30 are formed to be isolated as much as the dummy regions 31 corresponding to the area that the TFT array substrates 1 formed in the first mother substrate 20 are protruded.

Each unit LCD panel is disposed at the first and second mother substrates 20 and 30 so that the first and second mother substrates 20 and 30 are used at the maximum. Depending on a model, the unit LCD panels are generally formed to be isolated as much as the dummy regions 32. Dummy regions 21 for a process margin are also formed in the marginal portions of the first and second mother substrates 20 and 30.

After the first mother substrate 20 where the TFT array substrates 1 are formed and the second mother substrate 30 where the color filter substrates 2 are formed are attached to each other, the LCD panels are individually cut through the scribing process and the breaking process. The dummy regions 31 formed at the region where the color filter substrates 2 of the second mother substrate 30 are isolated. The dummy regions 32 isolating the unit LCD panels and the dummy regions 21 formed at the marginal potion of the first and second mother substrates 20 and 30, are simultaneously removed.

As shown in FIG. 2, in case of a model in which the dummy regions 31, 32, and 21 are formed on the first and second mother substrates 20 and 30, as the number of unit LCD panels which can be formed on the first and second mother substrates 20 and 30 is limited, efficiency in using the first and second mother substrates 20 and 30 is reduced and accordingly, productivity is decreased.

Taking the above problems into consideration, a cross-sectional structure of the first and second mother substrates in which the dummy regions 32 are not formed by preventing the unit LCD panels from being separated from each other, was suggested as shown in FIG. 3.

The cutting process to the unit LCD panels shown in FIG. 3 will now be described with reference to the sequential exemplary views, FIGS. 4A to 4J.

As shown in FIG. 4A, the first and second mother substrates 20 and 30 attached to face into each other are loaded on a first table 33.

Next, as shown in FIG. 4B, the first table 33 is moved in one direction to sequentially form a plurality of first scribing lines 42 on the first mother substrate 20 with a cutting wheel 41.

After the first and second mother substrates 20 and 30 in FIG. 4C are rotated by 90°, the first table 33 is moved back to its original position to sequentially form a plurality of second scribing lines 43 on the surface of the first mother substrate 20 through the cutting wheel 41.

FIG. 4D illustrates the first and second mother substrates 20 and 30, which are overturned and loaded on a second table 34. While the second table 34 is moved in one direction, the second mother substrate 30 is pressed by a breaking bar 44 along the second scribing lines 43 so that a crack is transmitted on the first mother substrate 20.

Next, as shown in FIG. 4E, the first and second mother substrates 20 and 30 are rotated by 90°. While the second table 34 is moved back to its original position, the second mother substrate 30 is pressed by the breaking bar 44 along the first scribing lines 42, so that a crack is transmitted on the first mother substrate 20.

As shown in FIG. 4F, the first and second substrates 20 and 30 are loaded on a third table 35. A plurality of third scribing lines 46 are sequentially formed on the surface of the second mother substrate 30 with a cutting wheel 45 by moving the third table 35 in one direction.

Thereafter, the first and second mother substrates 20 and 30 are rotated by 90°, as shown in FIG. 4G. A plurality of fourth scribing lines 47 are sequentially formed on the surface of the second mother substrate 30 with the cutting wheel 45 by moving the third table 35 back to its original position.

As shown in FIG. 4H, the first and second mother substrates 20 and 30 are overturned and loaded on a fourth table 36. The first mother substrate 20 is pressed by a breaking bar 48 along the fourth scribing line 47 by moving the fourth table 36 in one direction, so that a crack is transmitted on the second mother substrate 30.

Next, the first and second mother substrates 20 and 30 are rotated by 90°, as shown in FIG. 4I. The first mother substrate 20 is pressed by the breaking bar 48 along the third scribing line 46 by moving the fourth table 36 back to its original position, so that a crack is transmitted on the second mother substrate 30.

As shown in FIG. 4J, as the crack is transmitted on the first and second mother substrates 20 and 30 along the first through fourth scribing lines 42, 43, 46, and 47, the unit LCD panels are selectively unloaded by using a vacuum gripper 49 and conveyed to the equipment for the following process.

As mentioned above, in the conventional cutting processes for the unit LCD panel, a scribing process is performed four times and a breaking process is required four times while performing four rotation processes and two overturning processes.

Thus, two scribing units including a rotating unit and two breaking units including a rotating unit and an overturning unit are required. This equipment would occupy much space in the fabrication line. Thus, an installation expense and a space of the equipment are increased.

In addition, much more time is required for the scribing and breaking processes, resulting in a low productivity.

SUMMARY OF THE INVENTION

Accordingly, the present invention is directed to a method for cutting a liquid crystal display panel that substantially obviates one or more of problems due to limitations and disadvantages of the related art.

Another object of the present invention is to provide a method for cutting a liquid crystal display panel that reduces the number of scribing and breaking equipment and also reduces the time necessary for the overall process by minimizing rotations and overturnings in performing the scribing and breaking processes.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method for cutting a liquid crystal display panel includes forming a first scribing line on surfaces of first and second mother substrates using first and second wheels, cutting the first and second mother substrates along the first scribing line, forming a second scribing line on the second mother substrate using the second wheel, and removing a dummy region from the second mother substrate by cutting the second mother substrate along the second scribing line.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings.

FIGS. 5A to 5G illustrate sequential cutting processes of unit LCD panels in accordance with the present invention.

Figure 1:
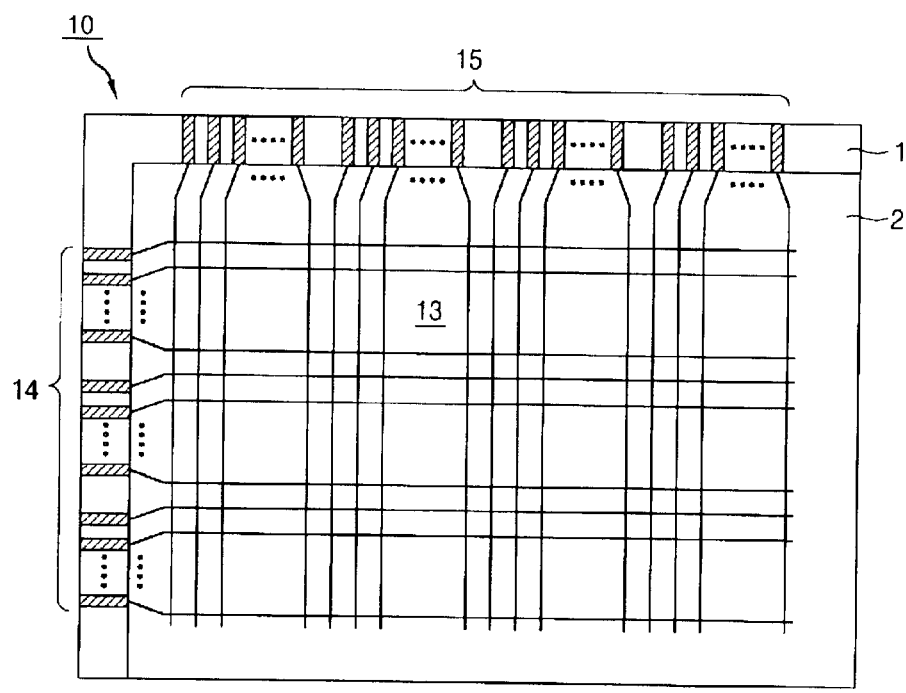
FIG. 1 is a schematic plane view showing a unit LCD panel formed from a TFT array substrate and a color filter substrate, which are attached to face into each other.
Figure 2:
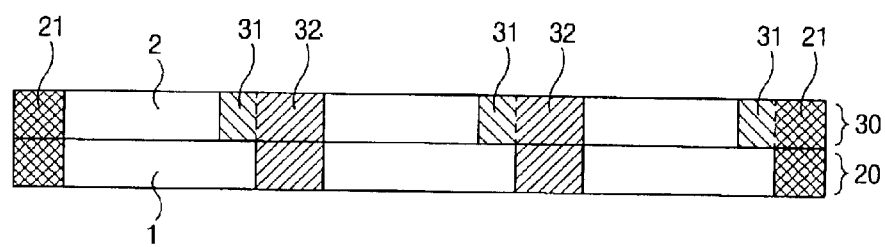
FIG. 2 is a cross-sectional view showing a plurality of LCD panels formed in a first mother substrate having the TFT array substrates and the second mother substrate having the color filter substrates of FIG. 1.
Figure 3:
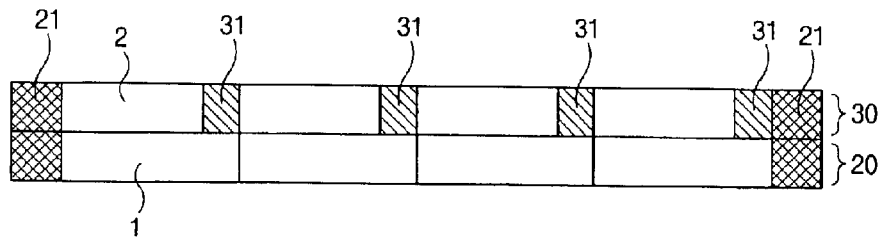
FIG. 3 is a cross-sectional view showing the first and second mother substrates in which dummy regions for separating the unit LCD panels are not formed.
Figure 4A:
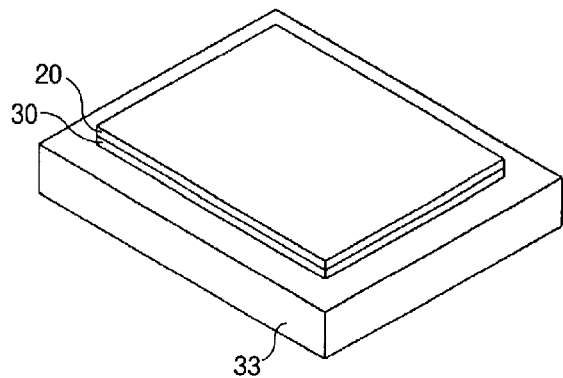
FIGS. 4A to 4J illustrate sequential cutting processes of unit LCD panels in accordance with a related art.
Figure 4B:
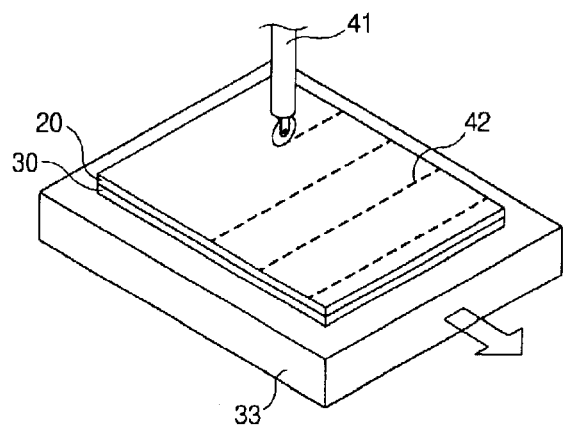
Figure 4C:
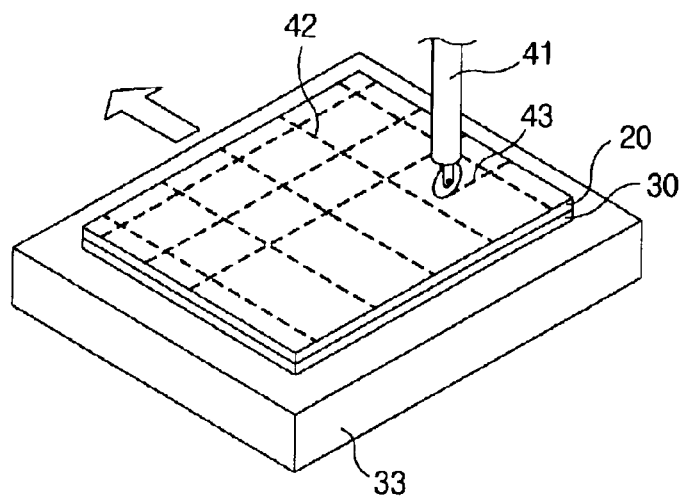
Figure 4D:
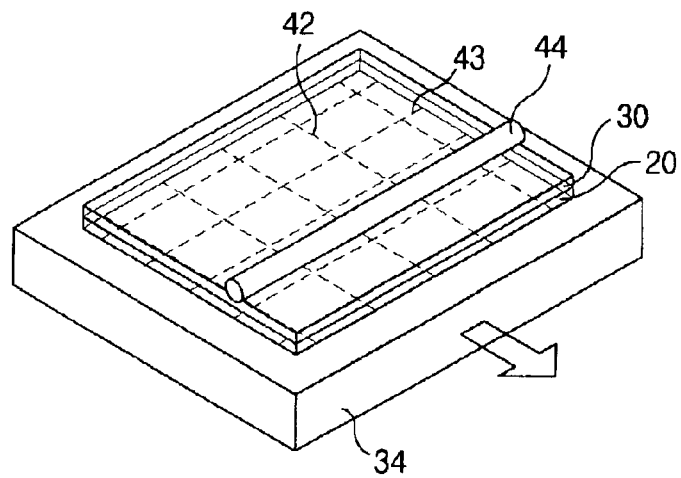
Figure 4E:
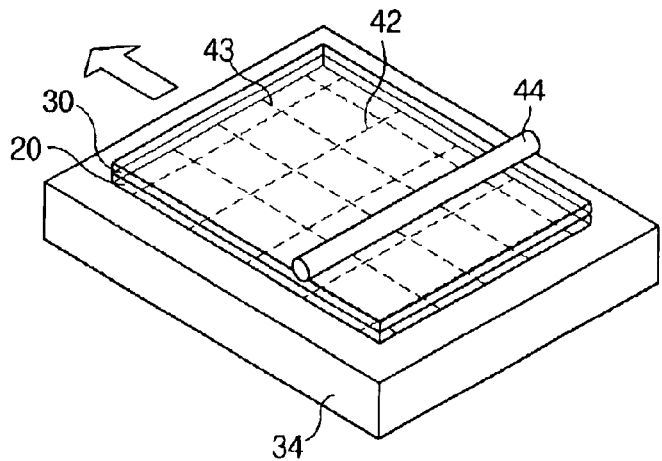
Figure 4F:
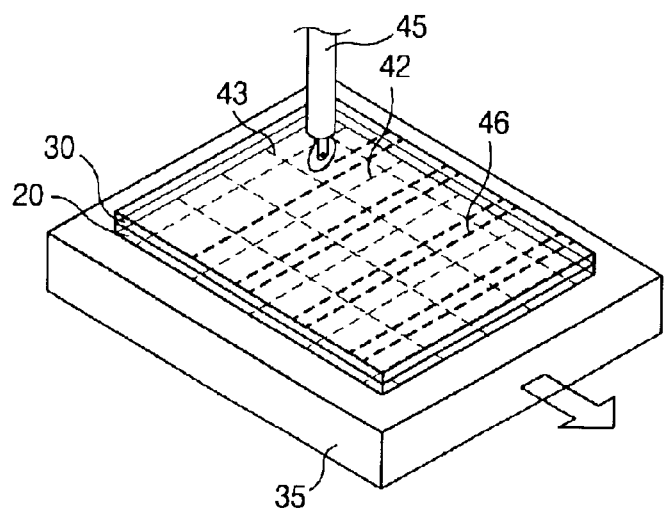
Figure 4G:
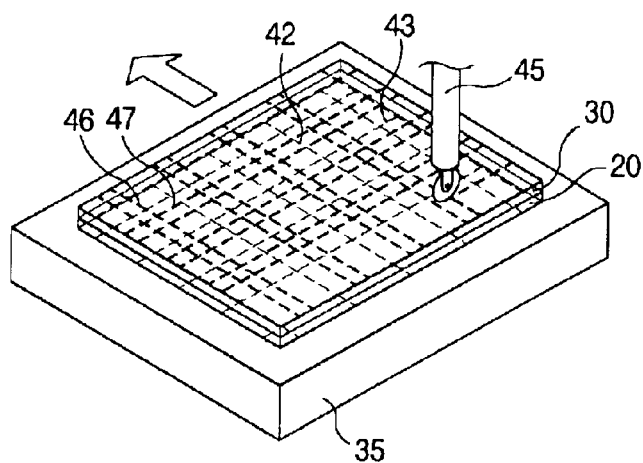
Figure 4H:
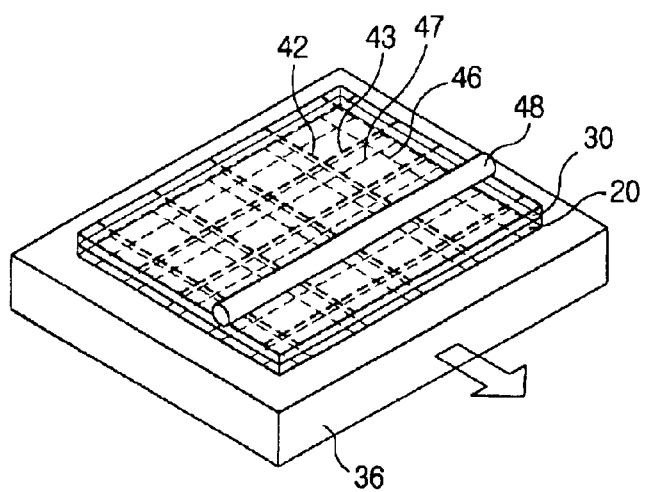
Figure 4I:
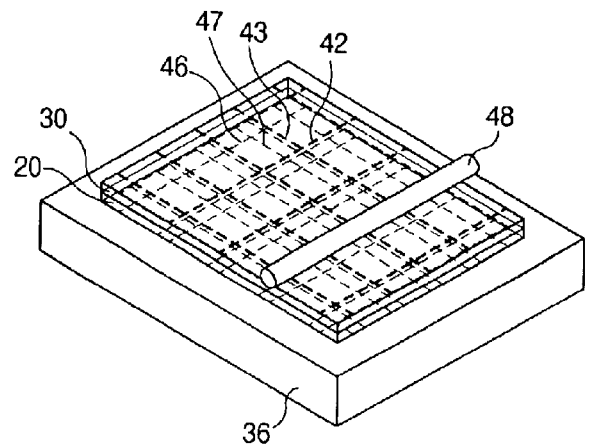
Figure 4J:
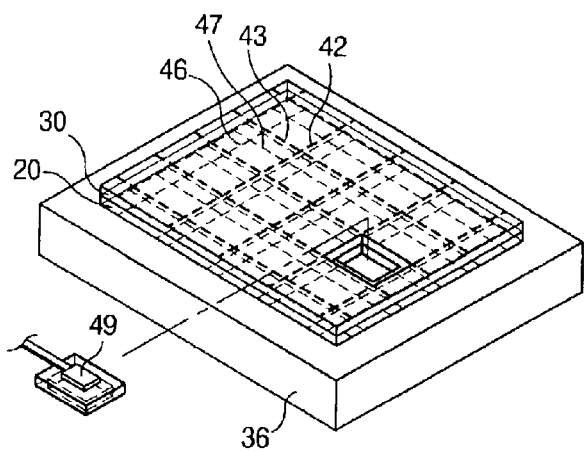
Figure 5A:
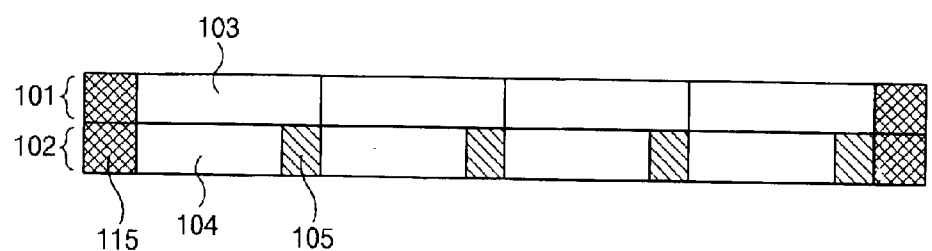
FIGS. 5A to 5G illustrate sequential cutting processes of unit LCD panels in accordance with the present invention.

As shown in FIG. 5A, a first mother substrate 101 and a second mother substrate 102 attached to face into each other are loaded for the following process. A plurality of TFT array substrates 103 are formed in the first mother substrate 101, while a plurality of color filter substrates 104 are formed in the second mother substrate 102.

The first mother substrate 101 including the TFT array substrates 103 is stacked on the second mother substrate 102 including the color filter substrates 104. When the first and second mother substrates 101 and 102 are loaded as such a state, an impact caused in the breaking process to a gate pad unit or a data pad unit formed on the TFT array substrates 103 may be minimized.

On the other hand, a side of the TFT array substrates 103 is formed to be more protrudent than that of the color filter substrates 104 in forming the unit LCD panels. This is because the gate pad unit and the data pad unit are formed at a marginal portion that is not overlapped the color filter substrates 104 of the TFT array substrate 103.

Accordingly, the color filter substrates 104 formed at the second mother substrate 102 are separated as much as a dummy region 105 corresponding to the area where the TFT array substrates 103 formed at the first mother substrate 101 apart.

In addition, a dummy region 115 for a process margin is formed at the marginal portion of the first and second mother substrates 101 and 102.

On the other hand, the TFT array substrates 103 formed at the first mother substrate 101 are formed to be adjacent with each other and not to be separated from each other. Thus, the first and second mother substrates 101 and 102 are more efficiently used to fabricate more unit LCD panels from the first and second mother substrates 101 and 102.

Figure 5B:
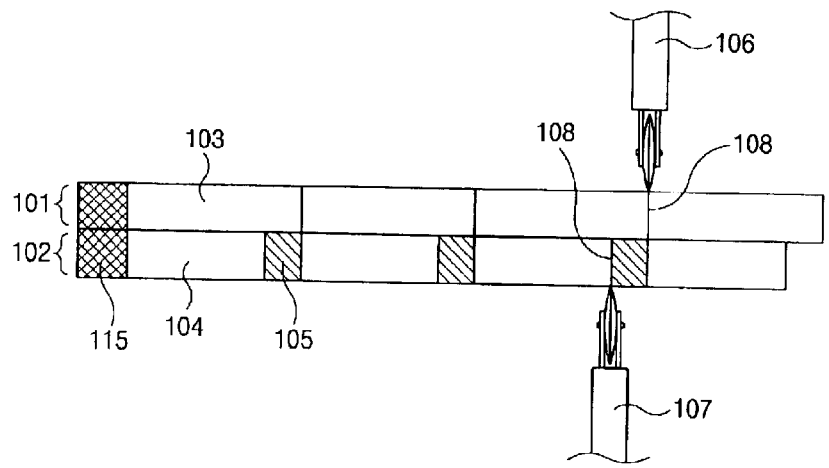

In FIG. 5B, a first scribing line 108 is formed by first and second wheels 106 and 107 which are vertically misaligned with each other on the surfaces of the first and second mother substrates 101 and 102. At this time, the dummy region 115 formed at a side end portion of the first and second mother substrates 101 and 102 is already removed by the first and second wheels 106 and 107.

The first scribing line 108 is formed by the first wheel 106 along the boundary of the TFT array substrates 103, which are formed at the first mother substrate 101. Thus, the first scribing line 108 is formed by the second wheel 107 along the boundary of the color filter substrates 104 and the dummy region 105 at the second mother substrate 102. The second wheel 107 is moved by a predetermined distance from the direction of the first wheel 106.

Figure 5C:
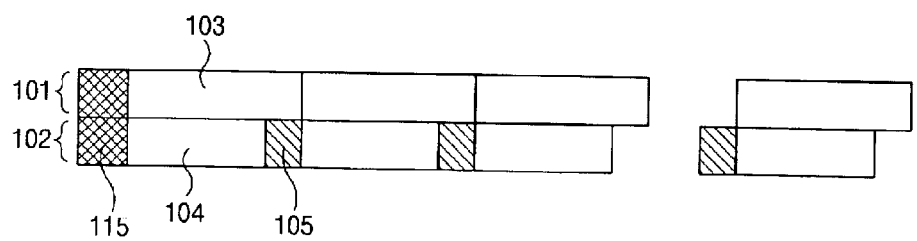

Then, as shown in FIG. 5C, the first and second mother substrates 101 and 102 are cut along the first scribing line 108.

Figure 5D:
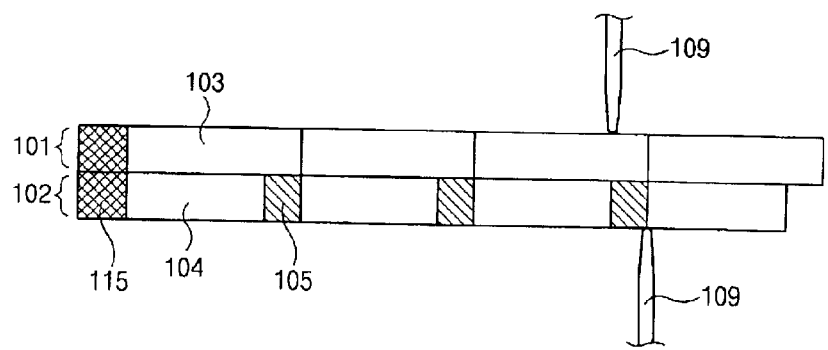
Figure 5E:
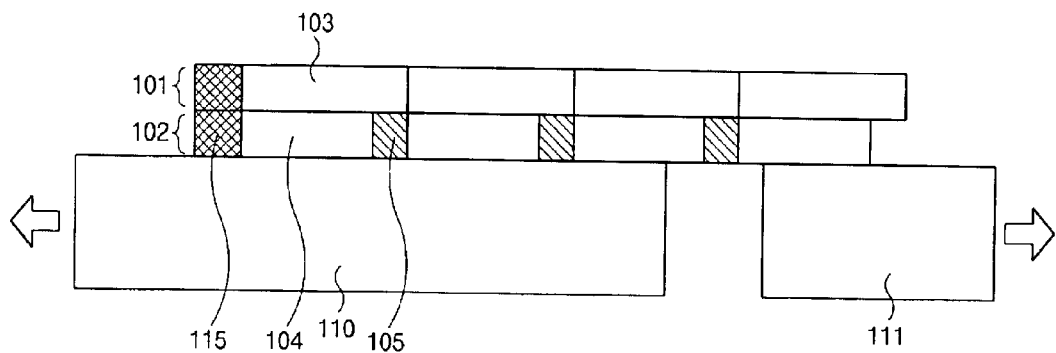

To cut the first and second mother substrates 101 and 102, as shown in FIG. 5D, a crack is transmitted by applying a pressure to at least a part of the first scribing line 108 using a roll 109 or applying a pressure along the first scribing line 108. Alternatively, as shown in FIG. 5E, the first and second mother substrates 101 and 102 may be cut by moving the first and second tables 110 and 111 to the opposite directions, where the first and second mother substrates 101 and 102 are held.

Figure 5F:
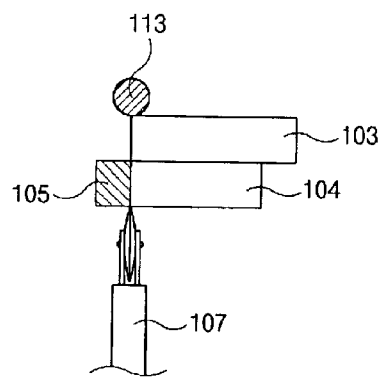

As shown in FIG. 5F, a second scribing line 112 is formed along the boundary of the color filter substrates 104 of the cut second mother substrate 102 and the dummy region 105 using the second wheel 107. At this time, it is desirable to support the first mother substrate 101 by a supporting bar 113 at the position where the second wheel 107 is vertically aligned with each other. The roll 109 applied to cut the first and second mother substrates 101 and 102 in FIG. 5D may be used as the supporting bar 113.

Figure 5G:
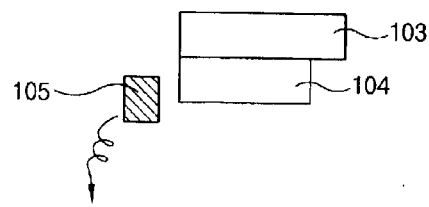

Therefore, as showing in FIG. 5G, the dummy region 105 is cut and removed from the second mother substrate 102 along the second scribing line 112.

In the cutting method of the LCD panel, the unit LCD panels are designed not to be separated and adjacent to each other. Thus, the scribing time is minimized in cutting the unit LCD panels from the first and second mother substrates. Accordingly, an additional overturning unit for overturning the first and second mother substrates and a breaking unit for transmitting cracks are not required and time for the scribing, breaking, and overturning processes is shortened. Therefore, productivity is improved and installation cost and space of equipment is saved in the present invention.

It will be apparent to those skilled in the art that various modifications and variations can be made in the method for cutting a liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A method for cutting a liquid crystal display panel, comprising:

forming a first scribing line on surfaces of first and second mother substrates using first and second wheels;

cutting the first and second mother substrates along the first scribing line;

forming a second scribing line on the second mother substrate using the second wheel, the second scribing line on the second mother substrate being formed by vertically aligning the second wheel with a supporting bar supporting the first mother substrate; and removing a dummy region from the second mother substrate by cutting the second mother substrate along the second scribing line.

2. The method of claim 1, wherein the first and second mother substrates along the first scribing line are cut by applying a pressure to at least a portion of the first scribing line.

3. The method of claim 1, wherein the first and second mother substrates along the first scribing line are cut by applying a pressure along the first scribing line with a roll.

4. The method of claim 1, wherein the first and second mother substrates along the first scribing line are cut by moving first and second tables where the first and second mother substrates are loaded thereon.

5. The method of claim 4, wherein the first and second tables are moved to the opposite directions with each other.

6. The method of claim 1, wherein the first mother substrate including a plurality of thin film transistor array substrates is stacked on the second mother substrate including a plurality of color filter substrates.

7. The method of claim 6, wherein the thin film transistor array substrates are adjacent to each other without separation and overlapping.

8. The method of claim 1, wherein the first and second wheels cut the first and second substrates and are vertically misaligned with each other.

9. A method for cutting a liquid crystal display panel, comprising:

forming a first scribing line on surfaces of first and second mother substrates using first and second wheels;

cutting the first and second mother substrates along the first scribing lines;

forming a second scribing line on the second mother substrate using the second wheel, the second scribing line on the second mother substrate being formed by vertically aligning the second wheel with a roll supporting the first mother substrate; and removing a dummy region from the second mother substrate by cutting the second mother substrate along the second scribing line.

10. The method of claim 9, wherein the first and second mother substrates along the first scribing line are cut by applying a pressure to at least a portion of the first scribing line.

11. The method of claim 9, wherein the first and second mother substrates along the first scribing line are cut by applying a pressure along the first scribing line with a roll.

12. The method of claim 9, wherein the first and second mother substrates along the first scribing line are cut by moving first and second tables where the first and second mother substrates are loaded thereon.

13. The method of claim 12, wherein the first and second tables are moved to the opposite directions with each other.

14. The method of claim 9, wherein the first mother substrate including a plurality of thin film transistor array substrates is stacked on the second mother substrates including a plurality of color filter substrates.

15. The method of claim 9, wherein the thin film transistor array substrates are adjacent to each other without separation and overlapping.

16. The method of claim 9, wherein the first and second wheels cut the first and second substrates and are vertically misaligned with each other.

* * * * *

UNITED STATES PATENT AND TRADEMARK OFFICE
CERTIFICATE OF CORRECTION

| | | |
|---|---|---|
| PATENT NO. | : 6,741,320 B2 | Page 1 of 1 |
| APPLICATION NO. | : 10/256100 | |
| DATED | : May 25, 2004 | |
| INVENTOR(S) | : Kyung-Su Chae and Sang-Sun Shin | |

It is certified that error appears in the above-identified patent and that said Letters Patent is hereby corrected as shown below:

On The Title Page Item (73) Assignee should read

--LG.Philips LCD Co., Ltd., Seoul (KR)--

Signed and Sealed this

Twenty-seventh Day of March, 2007

JON W. DUDAS
*Director of the United States Patent and Trademark Office*